United States Patent [19]

Kim

[11] Patent Number: 5,523,913
[45] Date of Patent: Jun. 4, 1996

[54] HEAD CLEANING SYSTEM OF A VIDEO CASSETTE RECORDER HAVING DOUBLE HEAD CLEANING ROLLERS ALTERNATELY USED

[75] Inventor: Dongkweon Kim, Incheon, Rep. of Korea

[73] Assignee: Daewoo Electronics Co., Ltd., Seoul, Rep. of Korea

[21] Appl. No.: 355,772

[22] Filed: Dec. 14, 1994

[30] Foreign Application Priority Data

Dec. 15, 1993 [KR] Rep. of Korea .................. 93-27811 U

[51] Int. Cl.$^6$ ...................................................... G11B 5/10
[52] U.S. Cl. ................................................................. 360/128
[58] Field of Search ................................................ 360/128

[56] References Cited

U.S. PATENT DOCUMENTS 5,182,691  1/1993  Mimasu .................................. 360/128

FOREIGN PATENT DOCUMENTS 4-205809  7/1992  Japan ..................................... 360/128

*Primary Examiner*—A. J. Heinz
*Attorney, Agent, or Firm*—Lowe, Price, LeBlanc & Becker

[57] ABSTRACT

A head cleaning system of a video cassette recorder comprises a couple of head cleaning rollers rotatably connected to two respective divergent ends of a lever. The lever has a convergent end opposite to the divergent ends and is mounted on a pivot. A sliding pin is rotatably secured to the convergent end of the lever so as to be engaged with an eccentric guide groove formed in a cam. The guide groove extends counterclockwise and radially. The sliding pin slides along the guide groove of the cam to rotate the lever on the pivot when the cam rotates in order to load or unload a video cassette tape into or out of the video cassette recorder. Each of the cleaning rollers is alternately in contact with a peripheral suface of a head drum to clean it in accordance with the rotation of the lever.

3 Claims, 2 Drawing Sheets

HEAD CLEANING SYSTEM OF A VIDEO CASSETTE RECORDER HAVING DOUBLE HEAD CLEANING ROLLERS ALTERNATELY USED

BACKGROUND OF THE INVENTION

1. Field of the Invention

The present invention relates to a head cleaning system of a video cassette recorder, and more particularly, to a head cleaning system of a video cassette recorder having double need cleaning rollers.

2. Description of the Prior Art

FIG. 1A of the accompanying drawings shows, by way of example, a conventional head cleaning system of a video cassette recorder, in which a head cleaning roller is in contact with a head drum to clean it when a video cassette ape is loaded or unloaded. FIG. 1B also shows the conventional head cleaning system of FIG. 1, in which the head cleaning roller is apart from the head drum during a recording and/or reproducing operation of the video cassette recorder. Referring to FIGS. 1A and 1B, the head drum 1 incorporates a head 2 in its peripheral surface.

A cam 3 is driven by a motor which is not shown. The cam 3 is formed with a guide groove 3a which is eccentric with respect to a camshaft 4, the eccentric guide groove 3a extending counterclockwise and radially. A lever 5 is positioned between the head drum 1 and cam 3, To one end of the lever 5 is secured a sliding pin 7 which engages with the eccentric guide groove 3a, and to the other end of the lever 5 is rotatably arranged a head cleaning roller 6 which cleans the head drum 1. The sliding pin 7 slides clockwise or counterclockwise in the guide groove 3a in accordance with a rotation of the cam 3.

A pivot 8 is disposed between the head cleaning roller 7 and eliding pin 7, and the lever 5 is so mounted as to rotate on the pivot 8 according to the rotation of the cam 3. The lever 5 is tilted near the pivot 8.

When loading or unloading a video cassette tape, the cam 3 rotates clockwise and the sliding pin 7 slides along the guide groove 3a of the cam 3 due to the rotation of the cam 3, as shown in FIG. 1A. Accordingly, the lever 5 rotates in a direction shown by an arrow A on the pivot 8, thereby to cause the head cleaning roller 6 to be in contact with the head drum 1 so that the head drum 1 can be cleaned by the cleaning roller 6.

Meanwhile, during a recording or reproducing operation of the video cassette recorder, the cam 3 rotates counterclockwise as shown in FIG. 1B and the sliding pin 7 slides in a direction opposite to that shown in FIG. 1A along the guide groove 3a by virtue of the rotation of the cam 3.

Accordingly, the lever 5 rotates in a direction shown by an arrow B on the pivot 8, thereby to cause the cleaning roller 6 to be apart from the head drum 1.

However, the conventional head cleaning system equipped with afore-mentioned structure has a problem in that when loading or unloading a video tape, since only a single cleaning roller 6 comes in contact with the head drum 1 to clean it, the cleaning roller 6 is easily contaminated by the head drum 1 and moreover, if a video cassette recorder has been used for a long period, the head drum 1 is not cleaned but contaminated by the contaminated head cleaning roller 6 so a desired cleaning for the head drum cannot be accomplished.

In addition, the head cleaning system has deficiency in that due to the cleaning by one cleaning roller 6 only, the cleaning roller 6 is easily worn.

SUMMARY OF THE INVENTION

It is therefore an object of the present invention to provide a head cleaning system of a video cassette recorder which is capable of solving the above-stated problems of the prior art. To attain this object, a head cleaning system according to one embodiment of the invention comprising:

a cam driven by a motor and provided with an eccentric guide groove, the guide groove extending counterclockwise and radially;

a lever having a convergent end operatively associated with the cam and two divergent ends opposite to the convergent end, the lever being mounted on a pivot and positioned between the cam and a head drum;

an engagement means for engaging with the guide groove of the cam, the engagement means being secured to the convergent end of the lever and slidably moved along the guide groove, thereby to cause the lever to rotate on the pivot when the cam rotates; and a couple of head cleaning rollers each of which is rotatably connected to the respective divergent ends of the lever and alternately in contact with a peripheral surface of the head drum to clean it in accordance with a rotation of the lever when the cam rotates.

Since a couple of head cleaning rollers come in alternate contact with the head drum to clean it when a video cassette tape is loaded or unloaded, the head cleaning system of the present invention can lessen the contamination of the cleaning rollers to obtain an improved cleaning for the head drum and alleviate wear of the cleaning rollers. Accordingly, a life span of the cleaning rollers can be extended and distinct pictures in a video cassette recorder can be obtained.

Other objects and features of this invention will become apparent from the following detailed description taken in conjunction with the accompanying drawings.

DESCRIPTION OF THE PREFERRED EMBODIMENT

The following description of a preferred embodiment of this invention shows the details of the invention with reference to the accompanying drawings.

Figure 1A:
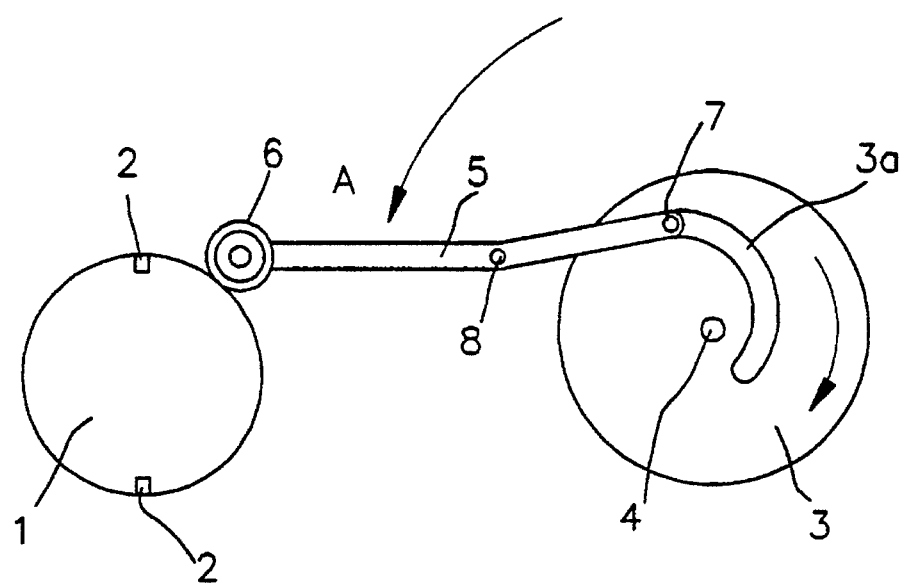
FIG. 1A is a schematic view showing a conventional head cleaning system of a video cassette recorder, in which a head cleaning roller is in contact with a head drum to clean it when a video cassette tape is loaded or unloaded.
Figure 1B:
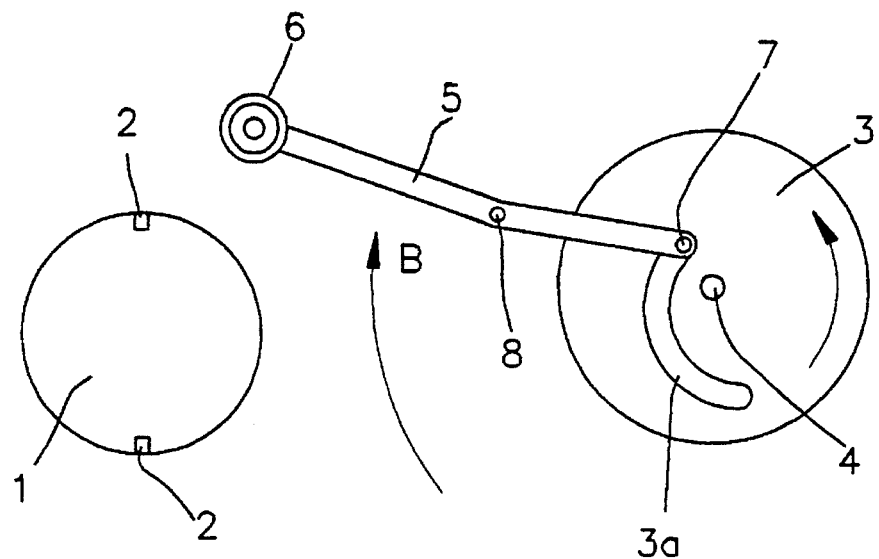
FIG. 1B is similar to FIG. 1A, except that the head cleaning roller is apart from the head drum during a recording and/or reproducing operation of a video cassette recorder.
Figure 2A:
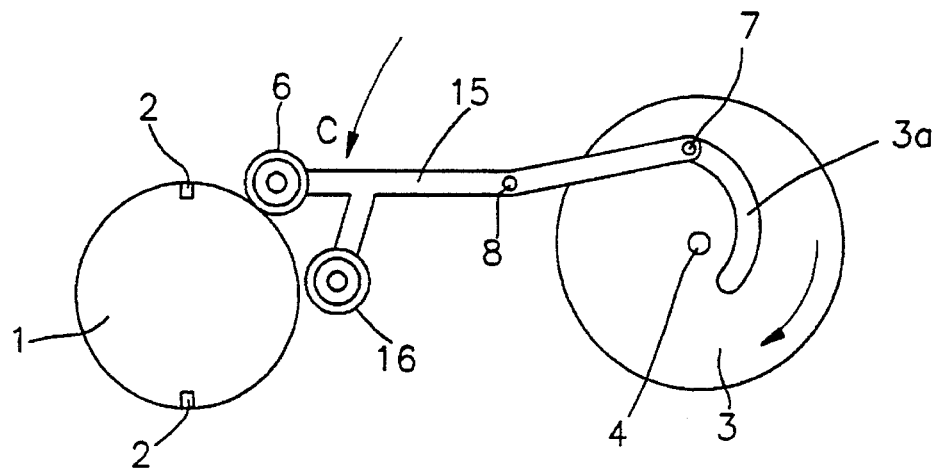
FIG. 2A is a schematic view showing a head cleaning system of a video cassette recorder according to one embodiment of the present invention, wherein a first head cleaning roller is in contact with the head drum to clean it when a video cassette tape is loaded.
Figure 2B:
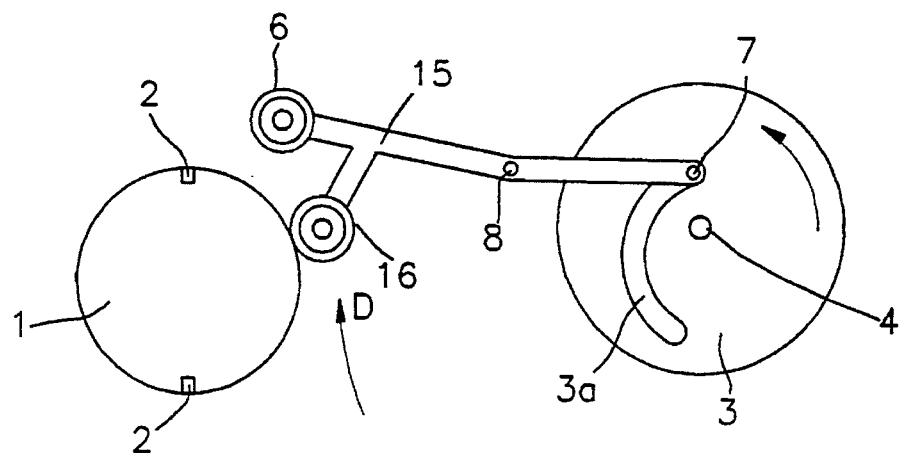
FIG. 2B is similar to FIG. 2A, except that a second head cleaning roller is in contact with the head drum to clean it when a video cassette tape is unloaded.
Figure 2C:
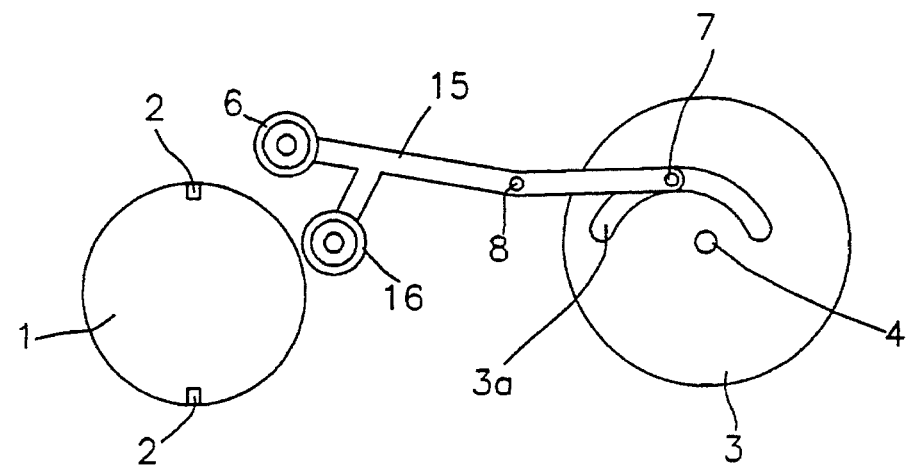
FIG. 2C is also similar to FIG. 2A, except that both the first and second cleaning rollers are apart from the head drum during a recording and/or reproducing operation of a video cassette recorder.

The embodiment is arranged as shown in FIGS. 2A through 2C. The parts which are the same as those shown in FIGS. 1A and 1B are indicated by the same reference numerals and details of most of them are omitted from the following description:

In this embodiment, a lever 15 has a substantial Y-shape and is provided with a convergent end operatively associated with the cam 3 and a couple of divergent ends opposed to the convergent end. To the convergent end of the lever 15 is rotatably secured the sliding pin 7 which engages with the guide groove 3a of the cam 3 and serves as an engagement means. The sliding pin 7 slides clockwise or counterclockwise along the guide groove 3a in accordance with the rotation of the cam 3. To each of the two divergent ends of the lever 15 is rotatably disposed a first head cleaning roller 6 and a second head cleaning roller 16, respectively. The pivot 8 is formed between the first cleaning roller end the sliding pin 7. The lever 15 is so mounted as to rotate on the pivot 8 in accordance with the rotation of the cam 3. It is preferable to form the lever 15 to be tilted near the pivot 8. The first and second cleaning rollers are so arranged that they can come in alternate contact with a peripheral surface of the head drum 1 according to the rotation of the lever 15 when the cam 3 rotates.

Hereinafter, a description of an operation of the head cleaning system according to the preferred embodiment of the invention wall be given:

As shown in FIG. 2A, when loading a video cassette tape, the cam 3 rotates clockwise and then the gliding pin 7 slides along the guide groove 3a. Accordingly, the lever 15 rotates in a direction indicated by an arrow C on the pivot 8 to cause the first head cleaning roller 6 to come in contact with the head drum 1 to clean it. Simultaneously, the second head cleaning roller 16 becomes separated from the head drum.

Meanwhile, when unloading a video cassette tape, the cam 3, as shown in FIG. 2B, rotates counterclockwise and then the sliding pin 7 slides along the guide groove 3a in a direction opposite to that shown in FIG. 2A. Accordingly, the lever 15 rotates in a direction indicated by an arrow D on the pivot 8 to cause the second cleaning roller 16 to come in contact with the head drum 1 to clean it. Simultaneously, the first cleaning roller 6 becomes separated from the head drum, During a recording and/or reproducing operation of a video cassette recorder, both the first and second cleaning rollers become separated from the head drum as shown in FIG. 2C.

As described above, since the head cleaning system of the invention adopts double head cleaning rollers which come alternately in contact with the head drum to clean it, it is possible to prevent the heed drum from being contaminated by the cleaning roller and thus a desired cleaning for the head drum is performed. Further, the wear of the cleaning rollers can be reduced. Accordingly, durability of the cleaning rollers can be extended and distinct pictures in a video cassette recorder can be obtained.

Although only a specific embodiment of the invention has been described in detail with reference to the accompanying drawings, it is to be understood that the invention is not limited to the illustrated embodiment and various changes and modifications may be made without departing from the scope and spirit of the invention as defined in the appended claims. For example, when a video tape is loaded, the first cleaning roller comes in contact with the head drum, and when a video tape is unloaded, the second cleaning roller comes in contact with the head drum in the embodiment described herein. The head cleaning rollers may be so arranged that when loading a video tape, the second cleaning roller may come in contact with the head drum, and when unloading a video tape, the first cleaning roller may come in contact with the head drum.

Also, the lever may be provided with more than three divergent ends and more than three cleaning rollers may be secured to the respective divergent ends, in order to cause each of the rollers to contact consecutively with the head drum according to the rotation of the lever.

What is claimed is:

1. A head cleaning system of a video cassette recorder, comprising:

a cam driven by a motor and provided with an eccentric guide groove, the guide groove extending counterclockwise and radially;

a lever being in a form of substantially Y-shape and having a convergent end operatively associated with the cam and two divergent ends opposite to the convergent end, the lever being mounted on a pivot to rotate in accordance with the rotation of the cam, positioned between the cam and a head drum, and tilted near the pivot;

an engagement means for engaging with the guide groove of the cam, the engagement means being secured to the convergent end of the lever and slidably moved along the guide groove to cause the lever to rotate on the pivot when the cam rotates; and a plurality of head cleaning rollers, each rotatably connected to the respective divergent ends of the lever and alternately in contact with a peripheral surface of the head drum to clean it in accordance with the rotation of the lever on the pivot when the cam rotates.

2. The head cleaning system according to claim 1, wherein the engagement means is a sliding pin.

3. The head cleaning system according to claim 2, wherein the sliding pin is rotatably secured to the convergent end of the lever.

* * * * *